(12) United States Patent
Tanaka et al.

(10) Patent No.: US 6,883,080 B1
(45) Date of Patent: Apr. 19, 2005

(54) PROGRAM EXECUTING APPARATUS AND PROGRAM DEVELOPMENT SUPPORTING APPARATUS

(75) Inventors: Teruaki Tanaka, Tokyo (JP); Hideaki Minamide, Tokyo (JP); Shigeki Nankaku, Tokyo (JP); Yoshinori Tsujido, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 389 days.

(21) Appl. No.: 09/773,558

(22) Filed: Feb. 2, 2001

(30) Foreign Application Priority Data

Sep. 25, 2000 (JP) ........................................ 2000-291257

(51) Int. Cl.[7] .......................... G06F 12/00; G06F 12/08; G06F 12/10
(52) U.S. Cl. ....................................................... 711/202
(58) Field of Search ................................. 711/114, 202; 714/8

(56) References Cited

U.S. PATENT DOCUMENTS

| | | | | |
|---|---|---|---|---|
| 4,200,930 A | * | 4/1980 | Rawlings et al. | 709/212 |
| 6,021,462 A | * | 2/2000 | Minow et al. | 711/114 |
| 6,052,773 A | | 4/2000 | DeHon et al. | 712/43 |

OTHER PUBLICATIONS

Microsoft Computer Dictionary, Copyright 1999, Microsoft Press, Fourth Edition, p. 69.*
Clements, Alan; "Bit Field Instructions", [Internet: http://wheelie.tees.ac.uk/users/a.clements/BF/BF.htm] (As of May 15, 2002).
Brey, Barry B.; Table of Contents: The Motorola Microprocessor Family: 68000, 68008, 68020, 68030 and 68040. (1995) [Internet: http://users1.ee.net/brey/t6.htm] (As of May 23, 2002).

* cited by examiner

*Primary Examiner*—Jack A. Lane
*Assistant Examiner*—Midys Inoa
(74) *Attorney, Agent, or Firm*—Leydig, Voit & Mayer, Ltd.

(57) ABSTRACT

A program executing apparatus such as a programmable controller has a re-structureable address conversion section restructuring an address to generate a new address for specifying bit data that corresponds to each bit position in a physical memory or an I/O memory. Further, a program development supporting apparatus, such as a control program development supporting apparatus, has a conversion tool that generates configuration data describing a detailed restructure indication to enable the program executing apparatus to restructure the address, and a program making access to the restructured address.

2 Claims, 12 Drawing Sheets

```
001:    unsigned char r1,r2,r3;
002:    r1=*((unsigned char*)0xc000);
003:    r2=r1;
004:    r2>>=1;
005:    r1&=r2;
006:    r2>>=1;
007:    r3=r2;
008:    r2>>=1;
009:    r3&=r2;
010:    r1|=r3;
011:    r2>>=1;
012:    r1|=r2;
013:    r1&=0x0001;
014:    r2=r1;
015:    r3=r1;
016:    r2<<=1;
017:    r3<<=2;
018:    r1|=r2;
019:    r1|=r3;
020:    *((unsigned char*)0xc001)=r1;
```

(1) LD X0
(2) AND X8
(3) LD Xf
(4) AND M8
(5) ORB
(6) OR M0
(7) OUT Y0
(8) OUT Y8
(9) OUT M10

FIG.15

PRIOR ART

```
001:    unsigned char r1,r2,r3,r4,r5,r6,r7,r8;
002:    r1=*((unsigned char*)0xa000);
003:    r2=*((unsigned char*)0xa001);
004:    r3=r2;
005:    r1&=r2;
006:    r3>>=7;
007:    r4=*((unsigned char*)0x0001);
008:    r4&=r3;
009:    r1|=r4;
010:    r5=*((unsigned char*)0x0000);
011:    r1|=r5;
012:    r1&=0x0001;
013:    r6=*((unsigned char*)0xa002);
014:    r6&=0xFFFE;
015:    r6|=r1;
016:    r7=*((unsigned char*)0xa003);
017:    r7&=0xFFFE;
018:    r7|=r1;
019:    r8=*((unsigned char*)0x0002);
020:    r8&=0xFFFE;
021:    r8|=r1;
022:    *((unsigned char*)0xa002)=r6;
023:    *((unsigned char*)0xa003)=r7;
024:    *((unsigned char*)0x0002)=r8;
```

PROGRAM EXECUTING APPARATUS AND PROGRAM DEVELOPMENT SUPPORTING APPARATUS

FIELD OF THE INVENTION

The present invention relates to a program executing apparatus and a program development supporting apparatus capable of restructuring a memory address so that bit data to be processed are concentrated at a specific address in a memory in carrying out operational processing inside a processor and control of an external device in a bit unit.

BACKGROUND OF THE INVENTION

When accessing a real memory or a real I/O unit, a general-purpose processor transmits an address signal, control signals including a read instruction and a write instruction, and data in the case of a write instruction, to a peripheral LSI generally called a companion chip. A general-purpose processor means a processor manufactured as a general-purpose product with no correction made for a specific application, that can be obtained in a commercial market, among processors that are manufactured by semiconductor makers as microprocessors in general. Examples of the general-purpose processors are the Pentium processor manufactured by Intel, the VR5000 processor manufactured by NEC, and the SH3 processor manufactured by Hatachi. In the following description, an apparatus that is equipped with such a general-purpose processor and a companion chip will be referred to as a program executing apparatus.

FIG. 9 is a block diagram showing a schematic configuration of a conventional program executing apparatus and a conventional program development supporting apparatus. This figure particularly shows a case in which a program executing apparatus is used as a programmable controller 10, and a program development supporting apparatus is used as a control program development supporting apparatus 20. The programmable controller is also called a programmable logic controller (PLC) or a sequencer, and generally operates according to a description of a special control program for sequence processing.

As shown in FIG. 9, the programmable controller 10 has a general-purpose processor 11, a companion chip 12 and a memory 13. The general-purpose processor 11, companion chip 12 and memory 13 are connected to each other through a system bus 15. This system bus 15 is constructed with an address bus, a data bus, and a control bus.

The sequence processing by the programmable controller 10 is basically performed as follows. That is, a signal is received from an input device, such as different types of sensors or various switches, and a control signal is transmitted to an output device, such as a display or an electromagnetic relay, based on a state of the input signal or in a specific order. The control program is a program that describes a flow of the sequence processing by the input device or the output device (i.e., an external device 30 shown in FIG. 9).

In general, this control program is developed using a general-purpose computer. A general-purpose computer means a personal computer or a program loader (i.e., a control program development supporting apparatus 20 shown in FIG. 9). The developed control program is transferred to the programmable controller through a communication interface. Particularly, the programmable controller 10 shown in FIG. 9 is a compiling programmable controller, which receives and executes an execution code 9 generated by the control program development supporting apparatus 20.

FIG. 10 is a diagram for explaining a process of generating the execution code 9 by the control program development supporting apparatus 20. In the control program development supporting apparatus 20, a conversion tool 101 converts a control program 1 described in a language for sequence processing, such as a ladder diagram or an instruction list, into a general-purpose language program 5. The general-purpose language program 5 is a program written in a programming language which many programmers know and which can be developed and corrected easily. Examples, of such programming languages are the C language and the C++ language. The control program development supporting apparatus 20 then compiles this general-purpose language program 5 using a general-purpose language compiler 102, thereby to generate the execution code 9.

In other words, the control program development supporting apparatus 20 can produce the execution code 9, that can be directly executed in the general-purpose processor 11 of the compiling programmable controller 10, from the control program 1, such as the instruction list.

The companion chip 12 shown in FIG. 9 not only functions as a relay for the general-purpose processor 11 to make access to the memory 13 but also provides, in may cases, an interface with a peripheral unit, such as the external device 30 connected to the outside. It is also possible to download the execution code 9 into the memory 13 through the companion chip 12.

Further, as one of methods for the general-purpose processor 11 to make access to the peripheral unit, such as the external device 30 for carrying out control, there has been known a memory mapped I/O system. The memory mapped I/O system allocates a control register of the peripheral unit to a part of a real memory address space of the memory 13 (hereinafter to be referred to as a physical address space to distinguish this real memory address space from the whole of the memory 13). According to the memory mapped I/O system, the general-purpose processor 11 accesses the control register of the peripheral unit by using a load/store instruction in a similar manner to that of accessing a work memory for carrying out an operation processing.

As another method of controlling a peripheral unit, there has been known an I/O address system that allocates a control register of the peripheral unit to an I/O address space exclusively for the peripheral unit, prepared separately from the physical address space. According to this I/O address system, the general-purpose processor 11 accesses the control register of the peripheral unit by using an exclusive I/O address access instruction, such as an IN instruction or an OUT instruction. The general-purpose processor 11 shown in FIG. 9 employs the I/O address system, and has a physical address space 40 and an I/O address space 50 within the memory 13.

Referring to FIG. 9, for making access to a physical address space 40 and an I/O address space 50, the general-purpose processor 11 transmits either an input command or an output command, and an address for indicating an address of a requested data, to the companion chip 12.

Upon receiving the address, the companion chip 12 extracts the data allocated to the requested address from the physical address space or the I/O address space, using an address conversion function set in advance, and transmits this data to the general-purpose processor 11. In the general-purpose processor 11, the minimum unit of data input/output is one byte (that is, eight bits). The general-purpose processor 11 can read data consisting of one byte, two bytes, four bytes, or eight bytes at once.

FIG. 11 is a diagram for explaining a data array in a physical address space. Furthermore, FIG. 12 is a diagram for explaining a data array in an I/O address space. In the control program 1 of the programmable controller 10, a device having X or Y attached to the header of a name of a variable means a device in the I/O address space. A device having M attached to the header of a name of variable means a device in the physical address space. In FIG. 11, a physical memory means a memory 13, such as a DRAM. In FIG. 12, physical I/O means a control register provided in a peripheral unit, such as the external device 30.

As shown in FIG. 11 and FIG. 12, the physical address space 40 and the I/O address space 50 have addresses identified in byte (eight bits) units. The general-purpose processor 11 makes access to the peripheral unit in byte units as well as carrying out operational processing in byte units.

The processing carried out by the general-purpose processor 11 is broadly divided into three. They are "a read processing for reading data from the outside into the register on the general-purpose processor 11", "an operational processing for processing data on the register", and "a write processing for writing data from the register to the outside". The general-purpose processor 11 achieves various kinds of program processing by repeating these three types of processing.

The general-purpose processor 11 processes data in its register in one clock cycle, based on an input clock. However, it takes a few clock cycles for the general-purpose processor 11 to make data access to and from the outside, that is, for the "processing of reading data from the outside" and the "processing of writing data to the outside". As a result, there has been a problem because most of the processing time is spent making access to data to and from the outside when a program has a content making frequent external data access. This results in a drop in the speed of executing the processing.

Further, in the programmable controller 10 shown in FIG. 9, many types of processing are carried out in bit units. When it is desired to read only one specific bit data, the general-purpose processor 11 installed in this apparatus must read at least eight bits, as the address access is in byte units in the programmable controller 10 as described above. In this case, the remaining seven bits become useless. Particularly, when it is desired to make access to n bit data that are arrayed in mutually different addresses, it is necessary to read meaningless data of 7×n bits.

The problems mentioned above will be explained in detail through examples. FIG. 13 is a diagram showing one example of a ladder diagram as one mode of the control program 1. The ladder diagram is a graphical programming language used in the programmable controller, and has a programming mode mainly for carrying out a logical operation called a contact (also called a bit device). In general, the ladder diagram has a mode of repetitively carrying out a logical operation like an AND operation and an OR operation to a necessary bit device and carrying out a certain operation when a result of the logical operation is true.

The ladder diagram shown in FIG. 13 expresses a realization of a series of sequence processing by making access to input devices X0, X8 and Xf, memory devices M0 and M10, and output devices Y0 to Y8.

In actual practice, the ladder diagram is converted into a text programming language called an instruction list (IL) that expresses processing equivalent to that of the original ladder diagram. The conversion tool 101 shown in FIG. 10 and an interpreter program controller directly handle this instruction list.

FIG. 14 is an instruction list that equivalently expresses the ladder diagram shown in FIG. 13. In FIG. 14, numbers (1) to (9) are row numbers prepared to facilitate the explanation, and these numbers do not exist in the actual instruction list. The contents of the processing corresponding to each row number will be explained below.

(1) Read a value of the bit X0 into the register of the general-purpose processor 11.
(2) Carry out an AND operation of the loaded data and a value of the bit X8.
(3) Read a value of the bit Xf into the register of the general-purpose processor 11.
(4) Carry out an AND operation of the loaded data and a value of the bit M8.
(5) Carry out an OR operation of the operation result of (2) above and the operation result of (4) above.
(6) Carry out an OR operation of the operation result of (5) above and the bit M0.
(7) Write the operation result of (6) above into the bit Y0.
(8) Write the operation result of (6) above into the bit Y8.
(9) Write the operation result of (6) above into the bit M10.

The control program development supporting apparatus 20 shown in FIG. 1 further needs to convert the instruction list described as shown in FIG. 14 into a general-purpose language program using the conversion tool 101. It is assumed that a general-purpose language program generated by the conversion tool 101 is a program described in the C language, and the general-purpose processor 11 is an eight-bit processor, as an example.

FIG. 15 is a diagram showing a result of converting the instruction list shown in FIG. 14 into an expression in the C language. In FIG. 15, numbers "001:" to "024:" are row numbers that are prepared to facilitate the explanation, and they do not exist in the actual C language source list. The contents of processing for each row are explained below. In order to make clear the correspondence between these processing contents and the instruction list shown in FIG. 14, the row numbers in the instruction list shown in FIG. 14 are called IL row numbers, and the row numbers in the source list described in the C language shown in FIG. 15 are called C row numbers.

Referring to FIG. 15, first in the C row number "001:", the statement declares that variables r1 to r8 that are used in this source are unsigned eight-bit character data. As described above, the input/output of the data stored in the memory is carried out in byte units. Therefore, in order to realize processing corresponding to the IL row number (1) in the C language, it is necessary to process one-byte data that includes the bit data X0, that is, one byte data stored in an address "a000" in the I/O address space.

Therefore, in the C row number "002:", the eight-bit data stored in the address "a0000" is substituted into the variable r1.

The processing of the IL row number (2) requires the bit data X8. Therefore, in the C row number "003:", the data having the address "a001" that includes the bit data X8 is substituted into the variable r2.

In the C row number "004:", the variabler 2 is substituted into the variable r3 in order to use the variable r3 as a variable that handles the bit data X8 as described later. In other words, at this state, the variable r3 includes the bit data Xf.

In the C row number "005:", an AND operation of the variable r1 and the variable r2 is carried out in bit units in order to realize the AND operation of the IL row number (2). The result of the AND operation is substituted into the variable r1. In this case, the bit data X0 is positioned at the lowest bit (hereinafter referred to as a zero-order bit) of the data stored in the address "a000". Similarly, the bit data X8 is also positioned at the zero-order bit of the data stored in the address "a001". Therefore, the AND operation result of the zero-order bits of the variable r1 and the variable r2 represents the result of the AND operation of the bit data X0 and X8.

The read processing of the bit data Xf is achieved in the IL row number (3). For this purpose, next, in the C row number "006:", the variable r3 is shifted to the right by seven bits. The shifted result is substituted into the variable r3. The bit data Xf is positioned at the highest bit (hereinafter referred to as a seventh bit) of the address "a001". Therefore, the bit data Xf is included in the variable r2 that has already been substituted in the C row number "003", that is, in the variable r3. Thus, when the bit data of the variable r3 is shifted to the right by seven bits, it is possible to obtain one byte in which the bit data Xf is positioned at the zero-order bit. As a result, the variable r3 after the shifting of bits can be utilized as the variable for processing the bit data Xf.

Next, the processing of the IL row number (4) requires the bit data M8. Therefore, in the C row number "007:", the data having the address "0001" in the physical address space that includes the bit data M8 is substituted into the variable r4.

In the C row number "008:", an AND operation of the variable r4 and the variable r3 is carried out in bit units in order to realize the AND operation of the IL row number (4). The result of the AND operation is substituted into the variable r4. Thus, the AND operation of the bit data Xf and the bit data M8 is realized by the AND operation of the variable r4 and the zero-order bit of the variable r3.

At this stage, the zero-order bit of the variable r1 expresses the AND result of the IL row number (2), and the zero-order bit of the variable r4 expresses the AND result of the IL row number (4). Therefore, in the C row number "009:", an OR operation of the value of the variable r1 and the variabler 4 is carried out in bit units in order to realize the OR operation of the IL row number (5). The result of the OR operation is substituted into the variable r1.

Next, the processing of the IL row number (6) requires the bit data M0. Therefore, in the C row number "010:", the data having the address "0000" in the physical address space that includes the bit data M0 is substituted into the variable r5.

At this stage, the zero-order bit of the variable r1 expresses the AND result of the IL row number (2) and the OR result of the IL row number (4). Therefore, in the C row number "011:", an OR operation of the variable r1 and the variable r5 is carried out in bit units in order to realize the OR operation of the IL row number (6). A result of the OR operation is substituted into the variable r1.

Next, in the C row number "012:", an AND operation of the variable r1 and a hexadecimal value "0001" is carried out in bit units in order to maintain the state of only the zero-order bit of the variable r1 and to clear the bit data of the first to seventh bits of the variable r1. The result of the AND operation is substituted into the variable r1.

In the processing of the IL row number (7), data is written into the bit data Y0. Therefore, in the C row number "013:", the data of the address "a002" in the I/O address space that includes the bit data Y0 is substituted into the variable r6.

Next, in the C row number "014:", an AND operation of the variable r6 and a hexadecimal value "FFFE" is carried out in bit units in order to maintain the state of only the first to seventh bits of the variable r6 and to clear the zero-order bit of the variable r6. The result of the AND operation is substituted into the variable r6.

At this stage, as shown in the C row number "015:", an OR operation of the variable r6 and the variable r1 is carried out in bit units. The result of the OR operation is substituted into the variable r6. As a result, the variable r6 becomes a byte in which only the zero-order bit has been replaced by the OR result of the zero-order bit of the IL row number (6).

In the processing of the IL row number (8), data is written into the bit data Y8. Therefore, in the C row number "016:", the data of the address "a003" in the I/O address space that includes the bit data Y8 is substituted into the variable r7.

Next, in the C row number "017:", an AND operation of the variable r7 and the hexadecimal value "FFFE" is carried out in bit units in order to maintain the state of only the first to seventh bits of the variable r7 and to clear the zero-order bit of the variable r7. The result of the AND operation is substituted into the variable r7.

At this stage, as shown in the C row number "018:", an OR operation of the variable r7 and the variable r1 is carried out in bit units. The result of the OR operation is substituted into the variable r7. As a result, the variable r7 becomes a byte in which only the zero-order bit has been substituted by the OR result of the zero-order bit of the IL row number (6).

In the processing of the IL row number (9), data is written into the bit data M10. Therefore, in the C row number "019:", the data of the address "0002" in the physical address space that includes the bit data M10 is substituted into the variable r8.

Next, in the C row number "020:", an AND operation of the variable r8 and the hexadecimal value "FFFE" is carried out in bit units in order to maintain the state of only the first to seventh bits of the variable r8 and to clear the zero-order bit of the variable r8. The result of the AND operation is substituted into the variable r8.

At this stage, as shown in the C row number "021:", an OR operation of the variable r8 and the variable r1 is carried out in bit units. The result of the OR operation is substituted into the variable r8. As a result, the variable r8 becomes a byte in which only the zero-order bit has been replaced by the OR result of the zero-order bit of the IL row number (6).

In the C row number "022:", the variable r6 obtained by the above operation is actually written into the address "a002" in order to realize the processing of the IL row number (7). Similarly, in the C row number "023:", the variable r7 obtained by the above operation is actually written into the address "a003" in order to realize the processing of the IL row number (8). In the C row number "024:", the value r8 obtained by the above operation is actually written into the address "0002" in order to realize the processing of the IL row number (9).

As explained above, it is necessary to carry out the processing in byte units in the source list that is expressed in the C language. Therefore, in order to process the bit data corresponding to each device, it is necessary to carry out data reading seven times in the C row numbers "002:", "003:", "007:", "010:", "013:", "016:", and "019:" and data writing three times in the C row numbers "022:", "023:" and "024:". When n clocks are required, where n is larger than 1, for accessing each device, there arises a data transfer waiting time of a total of about 10×n clocks in addition to the time required for the actual logical processing.

SUMMARY OF THE INVENTION

It is an object of the present invention to provide a program executing apparatus and a program development supporting apparatus minimizing the number of addresses to be accessed for processing bit data, by restructuring an address so that the bit data to be processed are concentrated at a specific address in a memory at the time of carrying out operational processing inside a processor and control of an external device in bit units.

A program executing apparatus according to one aspect of the present invention comprises an address conversion unit which mediates input/output of data by actually accessing a bit position in a physical memory or an I/O memory when a processor accesses a predetermined address according to a computer program. Furthermore, this address conversion unit comprises a re-structureable address conversion section that re-structures an address to generate a new address for specifying bit data of which bit position is corresponded to the physical memory or the I/O memory. Therefore, when it is necessary to access bit data distributed to a plurality of different addresses in the contents of a program to be executed by a processor, it is possible to generate one or a few addresses to which these bit data are concentrated.

In the program development supporting apparatus according to another aspect of the present invention, in order to make the program executing apparatus carry out an optimum execution of a program developed by the program development supporting apparatus, it is possible to instruct the program executing apparatus to request for a structuring of an address.

Other objects and features of this invention will become apparent from the following description with reference to the accompanying drawings.

BRIEF DESCRIPTION OF THE DRAWINGS

FIG. 15 is a diagram showing a result of converting an instruction list into an expression in the C language in the conventional program development supporting apparatus.

DESCRIPTION OF THE PREFERRED EMBODIMENTS

A preferred embodiment of the program executing apparatus and the program development supporting apparatus according to the present invention will be explained in detail with reference to the attached drawings. It should be noted that the implementation of this embodiment does not limit the present invention.

Figure 1:
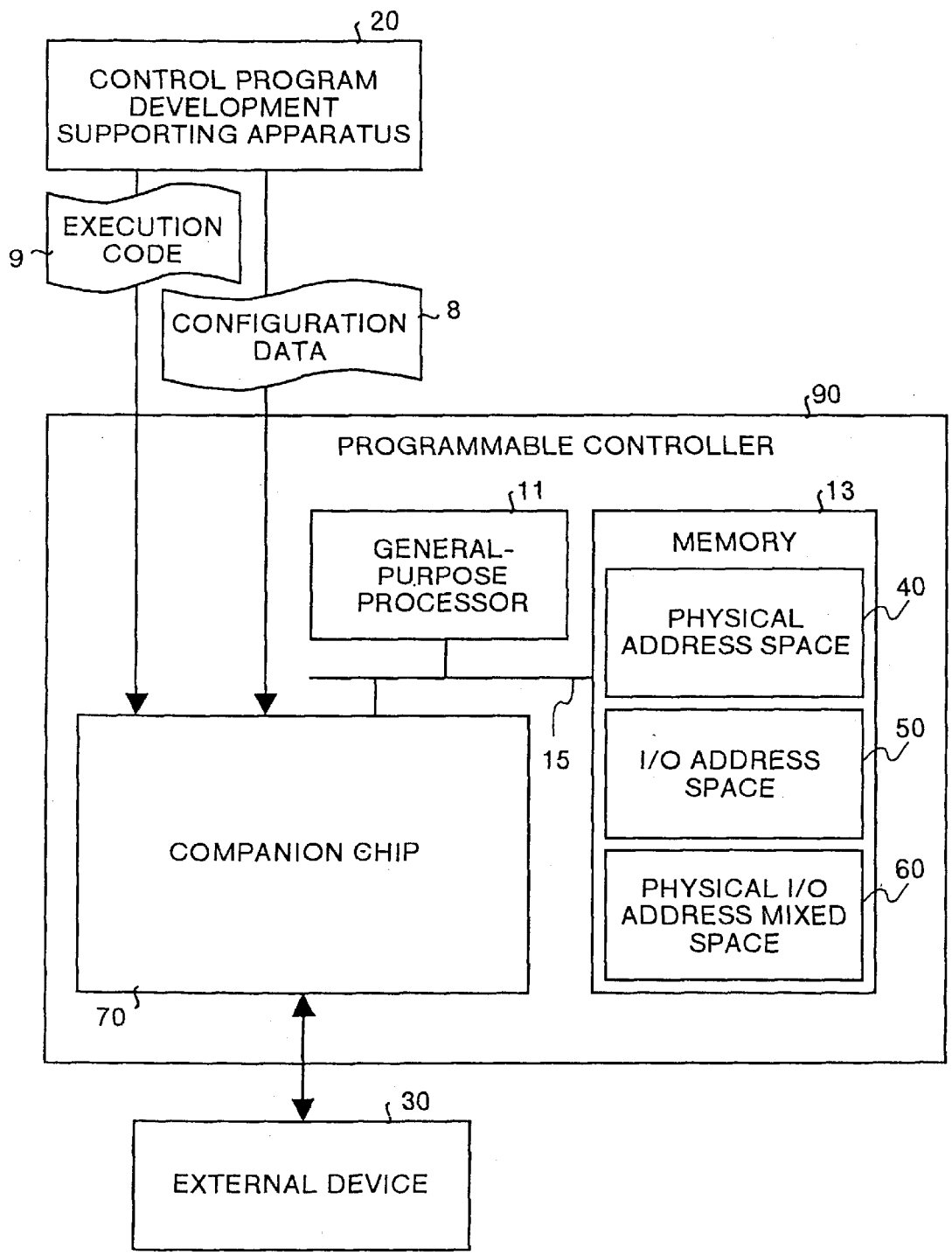
FIG. 1 is a block diagram showing a schematic configuration of a program executing apparatus and a program development supporting apparatus relating to an embodiment of the present invention.
Figure 9:
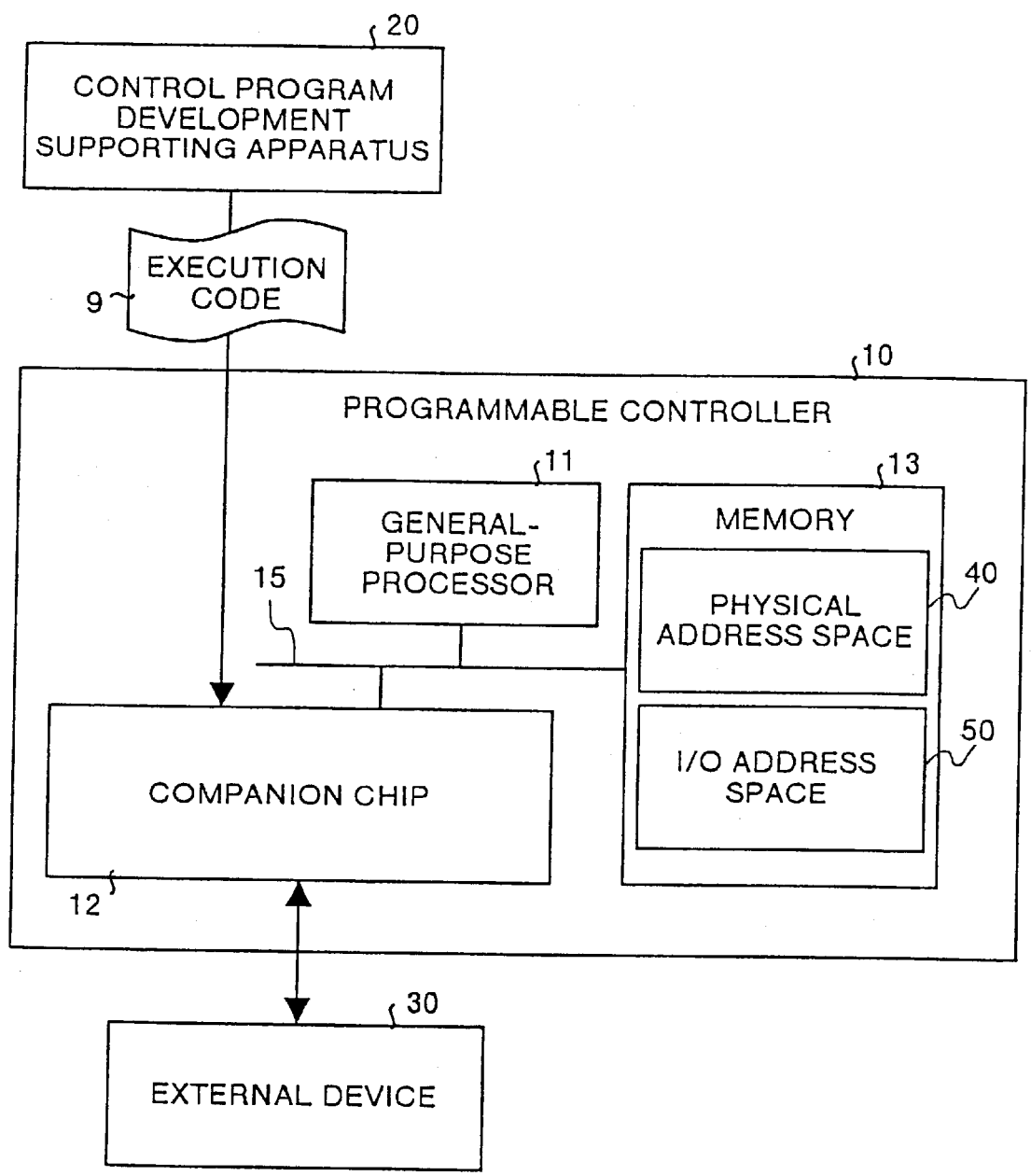
FIG. 9 is a block diagram showing a schematic configuration of a conventional program executing apparatus and a conventional program development supporting apparatus.

FIG. 1 is a block diagram showing a schematic configuration of a program executing apparatus and a program development supporting apparatus relating to the embodiment of the present invention. FIG. 1 particularly shows a case in which a program executing apparatus is used as a programmable controller 90, and a program development supporting apparatus is used as a control program development supporting apparatus 20. Sections that have the same or similar structure or function as the sections shown in FIG. 9 are provided with the same legends in FIG. 1 as in FIG. 9, and, in order to avoid repetition of explanation, their explanation is omitted.

The program executing apparatus such as the programmable controller 90 of this invention a re-structure-able address conversion section. This re-structureable address conversion section can extract, in a companion chip 70, bit data from an existing address and allocate the bit data to a new address based on configuration data 8.

The program development supporting apparatus such as the control program development supporting apparatus 20 of this invention generates a directly executable execution code 9 in a general-purpose processor 11, mounted on a program executing apparatus, like the programmable controller 90, from a control program, like an instruction list. At the same time, the program development supporting apparatus extracts bit data arrayed at mutually different addresses from among the bit data that are accessed in the control program. Further, the program development supporting apparatus generates (i) configuration data that describes an address to which the extracted bit data are allocated in concentration, and (II) information relating to the bit data.

Referring to FIG. 1, a memory 13 has a physical address space 40 and an I/O address space 50 distinctly separate from each other, as in conventional practice. Furthermore, the memory 13 has a physical I/O address mixed space 60 having a part of the bit data positioned in the physical address space 40 and a part of the bit data positioned in the I/O address space 50 allocated to the same address.

Figure 2:
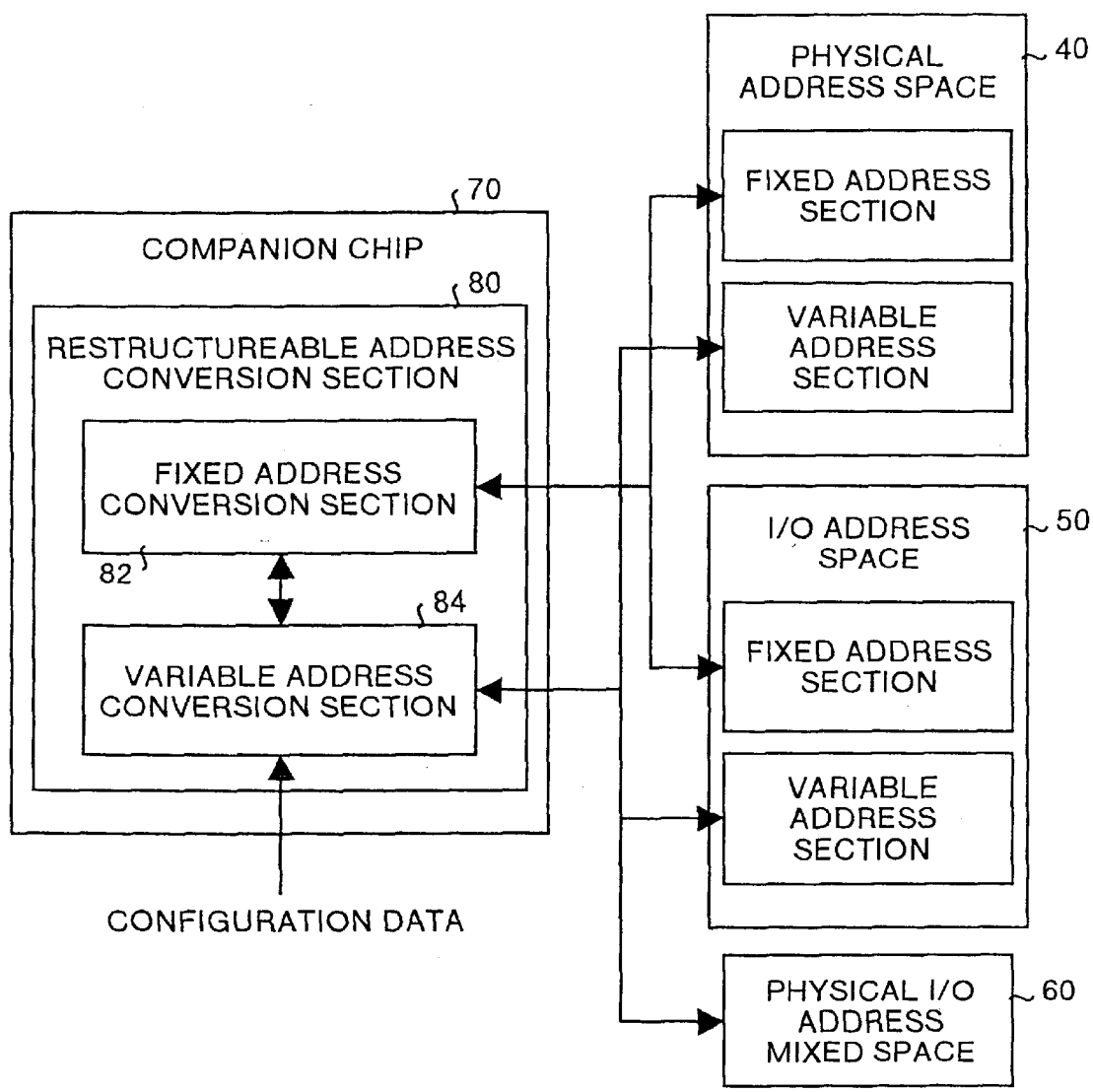
FIG. 2 is a block diagram showing a schematic configuration of a companion chip of the program executing apparatus relating to an embodiment of the invention.

FIG. 2 is a block diagram showing a schematic configuration of a companion chip of the program executing apparatus relating to the present embodiment. As shown in FIG. 2, the companion chip 70 has a re-structureable address conversion section 80. The re-structureable address conversion section 80 consists of a fixed address conversion section 82 and a variable address conversion section 84.

Figure 11:
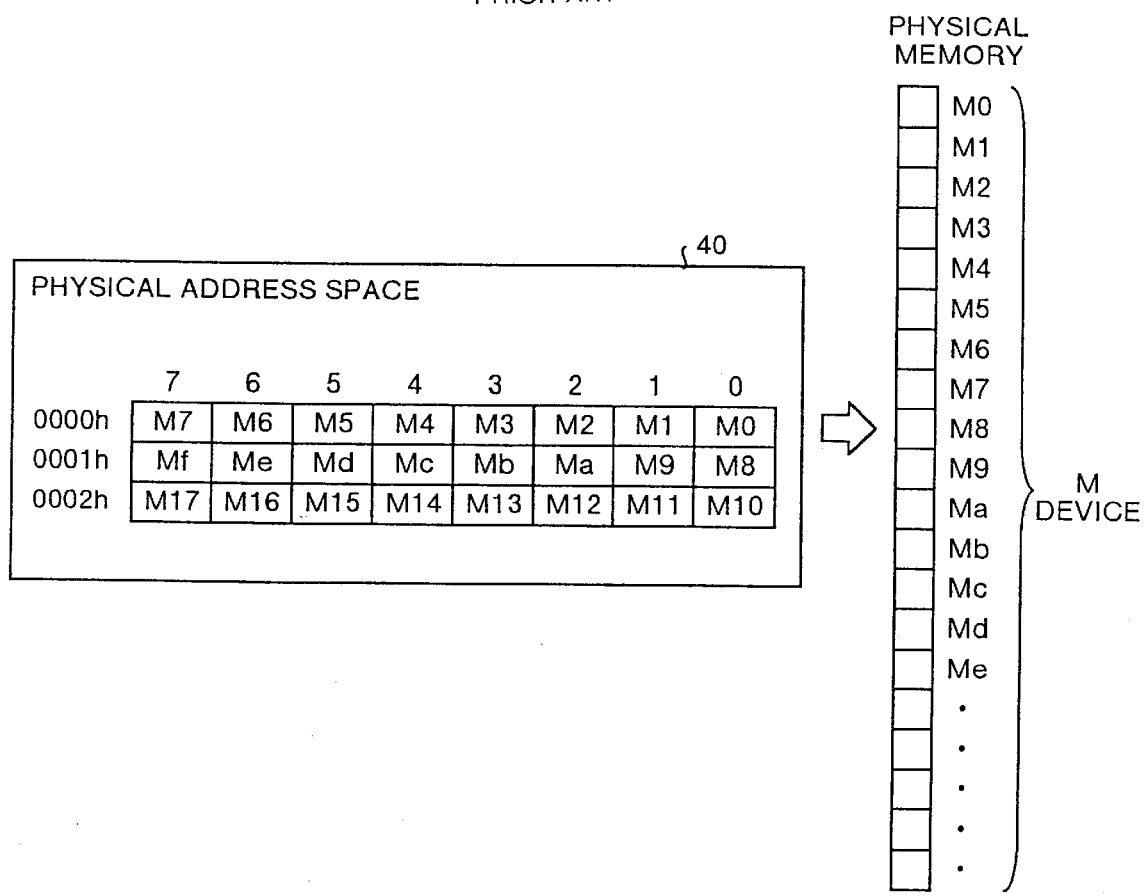
FIG. 11 is a diagram for explaining a data array in a physical address space.
Figure 12:
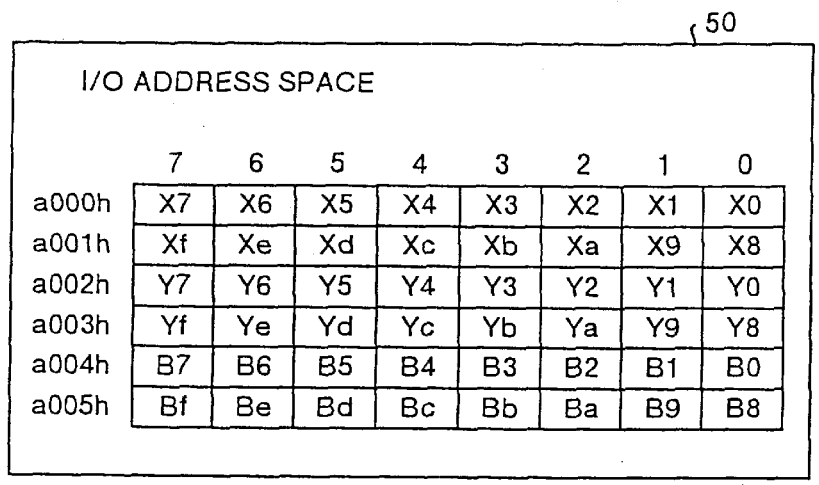
FIG. 12 is a diagram for explaining a data array in an I/O address space.
Figure 12:
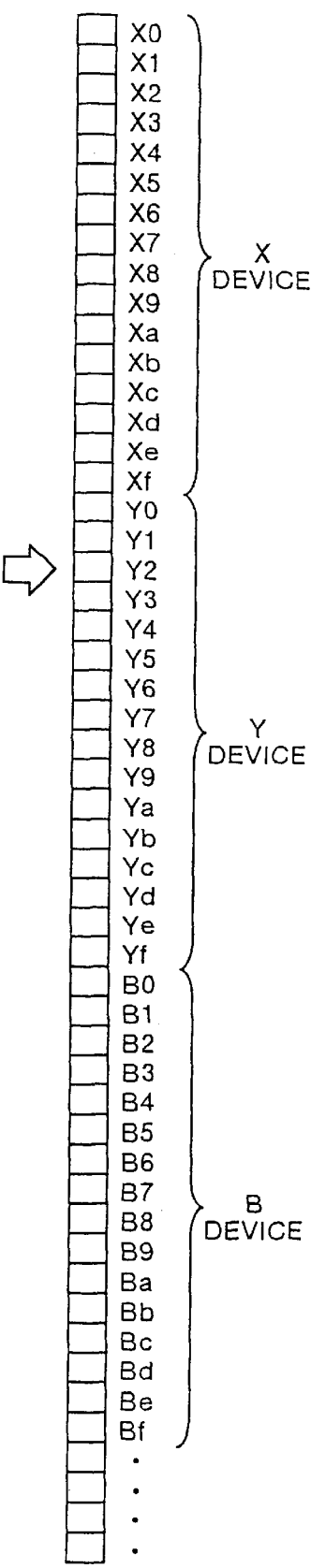

The fixed address conversion section 82 makes it possible to access a fixed address section in the physical address space 40 and the I/O address space 50 respectively, upon an input/output request from the general-purpose processor 11. The fixed address section is a portion that shows a conventional address array as shown in FIG. 11 and FIG. 12.

A variable address conversion section 84 generates a variable address section to which bit data has been allocated by restructuring the bit data based on the configuration data 8, and makes it possible to access this variable address at an input/output request from the general-purpose processor 11.

The re-structure-able address conversion section 80 equipped with the fixed address conversion section 82 and the variable address conversion section 84 can be realized in a mode that can be programmed at a logic level like CPLD and FPGA. This can also be an exclusive microcontroller specialized in an address conversion.

Figure 3:
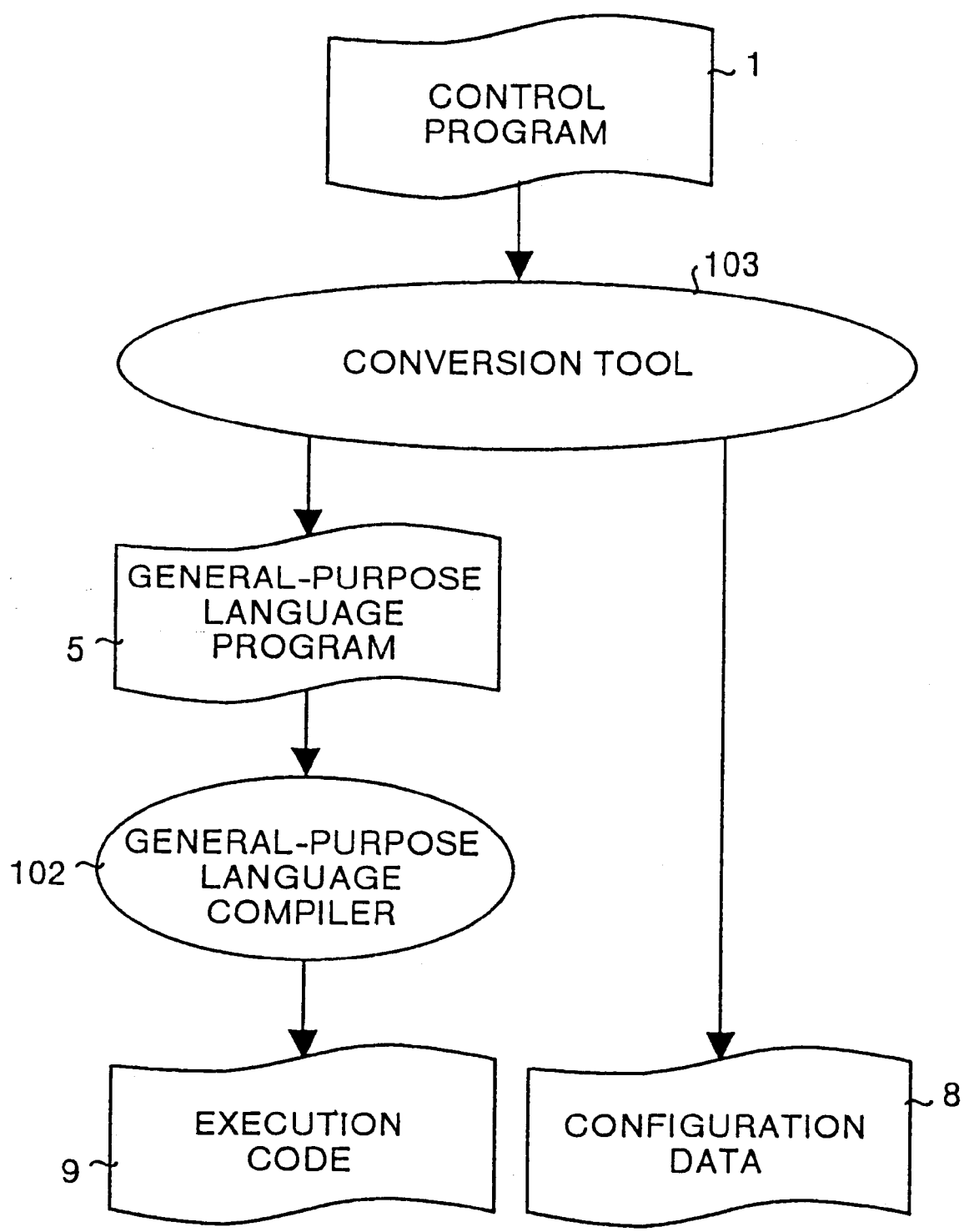
FIG. 3 is an explanatory diagram for explaining a processing for generating an execution code and configuration data in the program development supporting apparatus relating to an embodiment of the invention.
Figure 10:
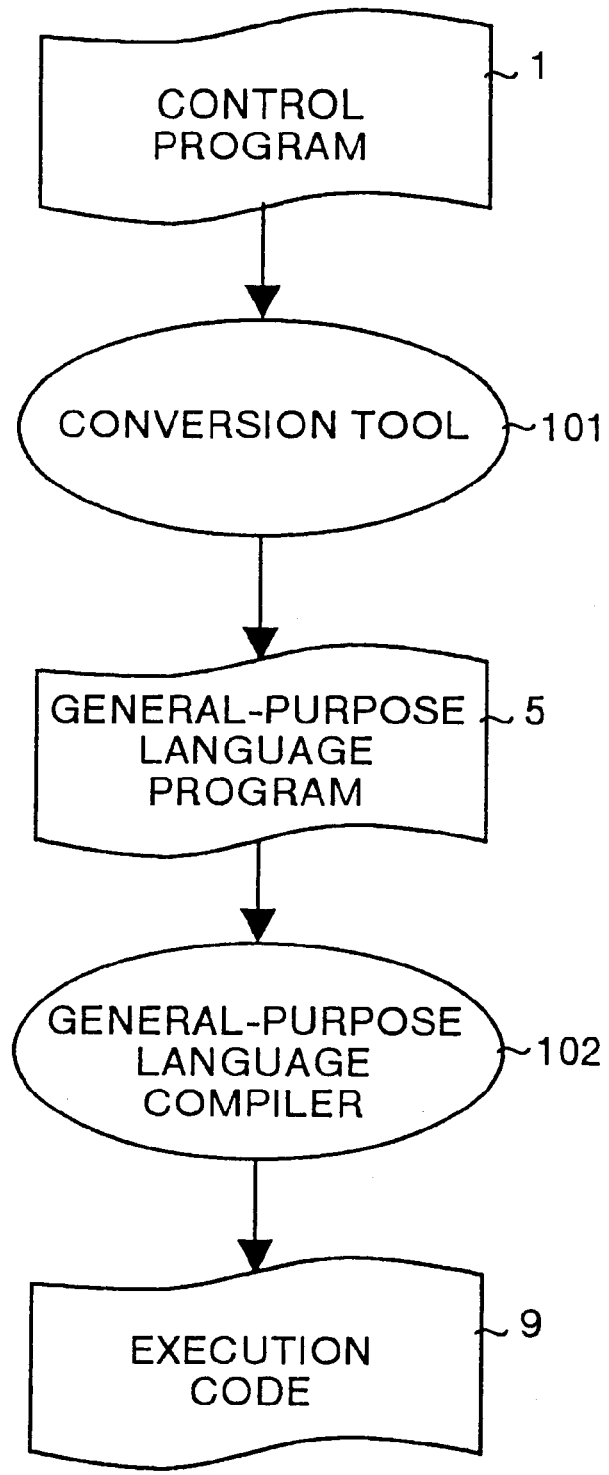
FIG. 10 is an explanatory diagram for explaining a process of generating an execution code by a conventional program development supporting apparatus.

FIG. 3 is an explanatory diagram for explaining a processing for generating the execution code 9 and the configuration data 8 in the program development supporting apparatus 20. Sections that have same or similar structure or function as the sections shown in FIG. 10 are provided with the same legends in FIG. 3, and, in order to avoid repetition of explanation, their explanation is omitted. As the execution code 9 finally obtained, it is possible to employ an ELF format that is employed as an output of a general-purpose language compiler 102.

Referring to FIG. 3, a conversion tool 103 converts a control program 1 described in a language for sequence processing, like a ladder diagram or an instruction list, into a general-purpose language program 5 like the C language or the C++ language. Furthermore, the conversion tool 103 generates the configuration data 8 based on description contents of the control program 1.

The processing carried out by the conversion tool 103 will be explained in detail here. First, the conversion tool 103 sequentially analyzes an external access described in the given control program 1 in the order of the program processing, thereby orderly arraying access data to be utilized. Subsequently, the conversion tool 103 aligns the access data in a suitable byte width, and orderly allocates the access data to vacant addresses to avoid a superposition of the data with another external resource. The general-purpose language program 5 and the configuration data 8 are output sequentially based on this address allocation.

The configuration data 8 generated by the conversion tool 103 will be explained below. The configuration data 8 describes contents that prescribe a specific address belonging to any one of the physical address space 40, the I/O address space 50, and the physical I/O address mixed space 60 to which bit data is to be allocated by restructuring. The configuration data 8 further describes a correspondence between each bit of a specific address and bit data at an address that belongs to the physical address space 40 or the I/O address space 50.

In other words, the correspondence is prescribed such that among the addresses that belong to the physical address space 40 or the I/O address space 50, the order of bits of which address is to be allocated to the zero-order bit of a specific address is specified. The correspondence is prescribed such that among the addresses that belong to the physical address space 40 or the I/O address space 50, the order of bits of which address is to be allocated to the first bit of a specific address is specified.

An example of the general-purpose language program 5 that is generated by the conversion tool 103 will be explained next. In order to make a comparison with the conventional example, there will be explained a case where the conversion tool 103 generates the general-purpose language program 5 by converting the instruction list shown in FIG. 14.

Figures 13, 14:
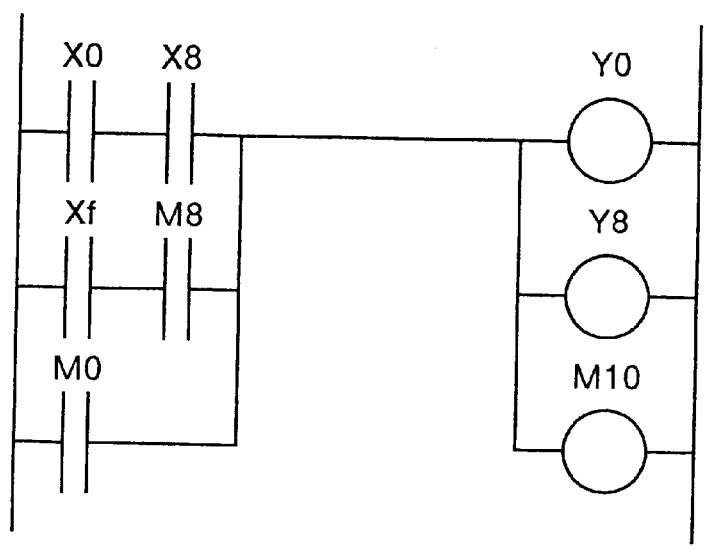
FIG. 13 is a diagram showing one example of a ladder diagram.
FIG. 14 is an instruction list that equivalently expresses a ladder diagram in the conventional program development supporting apparatus.

First, the conversion tool 103 sequentially analyzes the instruction list expressed in FIG. 14. Thus, it can be known that a bit device to be read is (X0, X8, Xf, M8, M0), and that a bit device to be output is (Y0, Y8, M10) The addresses to which the bit data are allocated are prescribed as "c000" and "c001", for example. The specified bit data (X0, X8, Xf, M8, M0) are allocated sequentially from the lowest bit, to the address "c000". The specified bit data (Y0, Y8, M10) are allocated sequentially from the lowest bit, to the address "c001".

The bits that are not allocated to the addresses "c000h" and "c001h" have their bit values indicated as invalid for input/output. Invalid in this case means that a value that has been read out is indefinite, and that a value that has been written makes no change.

It is possible to set an optional fixed value (0 or 1) for the invalid bit, by the configuration data 8. It is assumed that 0 is set in this case. The conversion tool 103 allocates the addresses in this way, and converts the control program 1 into the general-purpose language program 5 based on this allocation information.

Figures 4, 5:
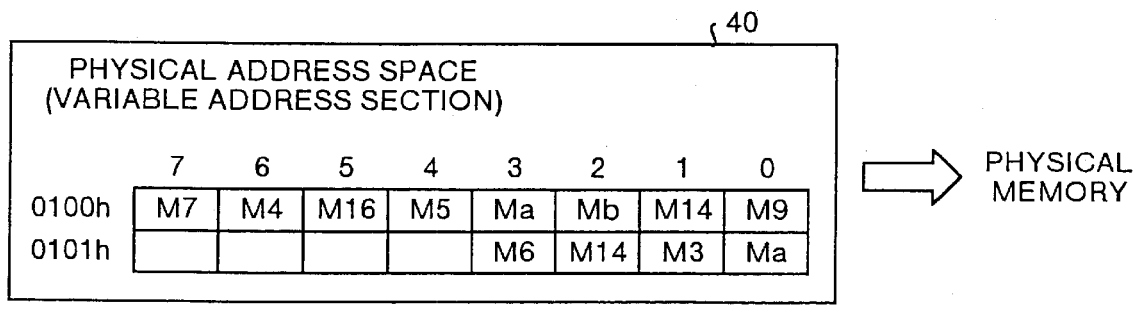
FIG. 4 is a diagram showing a result of converting an instruction list into an expression in the C language in the program development supporting apparatus relating to the embodiment of the invention.
FIG. 5 is a diagram showing an example of an allocation of a physical address space restructured by a variable address conversion section in the program executing apparatus relating to the embodiment of the invention.

FIG. 4 is a diagram showing a result of converting an instruction list into an expression in the C language in the program development supporting apparatus relating to an embodiment of the invention. This shows the contents prepared based on the assumption that access is made to the newly allocated addresses "c000" and "c001" as shown in the above example. In FIG. 4, numbers "001:" to "020:" are row numbers prepared to facilitate the explanation, and these numbers do not exist in the actual C language instruction list.

The contents of the processing corresponding to each row number will be explained below. In order to make clear the correspondence between these processing contents and the instruction list shown in FIG. 14, the row numbers in the instruction list shown in FIG. 14 will be called IL row numbers, and the row numbers in the source list described in the C language shown in FIG. 4 will be called C row numbers.

Referring to FIG. 4, first in the C row number "001:", the statement declares that variables r1 to r3 that are used in this source are unsigned eight-bit character data. In the C row number "002:", the eight-bit data stored in the address "c0000" is substituted into the variable r1. At this stage, the variable r1 includes the bit data X0, X8, Xf, M8, and M0. Particularly, at this stage, the bit data X0 that is read out in the processing of the IL row number (1) is positioned in the zero-order bit of the variable r1.

The processing of the IL row number (2) requires the bit data X8. Therefore, in the C row number "003:", the value of the variable r1 is substituted into the variable r2. In the C row number "004:", the value of the variable r2 is shifted to the right by one bit, and the shifted result is substituted into the variable r2 again. In other words, at this stage, the bit data X8 is positioned in the zero-order bit of the variable r2.

In the C row number "005:", an AND operation of the variable r1 and the variable r2 is carried out in bit units in order to realize the AND operation of the IL row number (2). The result of the AND operation is substituted into the variable r1. Therefore, the zero-order bit of the variable r1 expresses the result of the AND operation of the variable r1 and the zero-order bit of the variable r2, that is, the result of the AND operation of the bit data X0 and X8.

Next, in order to realize the processing corresponding to the IL row number (3), the variable r2 is shifted to the right by one bit in the row number "006:", and the shifted result is substituted into the variable r2 again. In other words, at this stage, the bit data Xf is positioned in the zero-order bit of the variable r2.

Further, in the C row number "007:", the value of the variable r2 is substituted into the variable r3. In the C row number "008:", the value of the variable r3 is shifted to the right by one bit, and the shifted result is substituted into the variable r3 again. In other words, at this stage, the bit data M8 is positioned in the zero-order bit of the variable r3.

In the C row number "009:", an AND operation of the variable r3 and the variable r2 is carried out in bit units to realize the AND operation of the IL row number (4). The result of the AND operation is substituted into the variable r3. Therefore, the zero-order bit of the variable r3 expresses the result of the AND operation of the variable r3 and the zero-order bit of the variable r2, that is, the result of the AND operation of the bit data M8 and Xf.

At this stage, the zero-order bit of the variable r1 expresses the AND result of the IL row number (2), and the zero-order bit of the variable r3 expresses the AND result of the IL row number (4). Therefore, in the C row number "010:", an OR operation of the variable r1 and the variable r3 is carried out in bit units in order to realize the OR operation of the IL row number (5). The result of the OR operation is substituted into the variable r1.

Next, the processing of the IL row number (6) requires the bit data M0. Therefore, in the C row number "011:", the value of the variable r2 is shifted to the right by one bit, and the shifted result is substituted into the variable r2 again. In other words, at this stage, the bit data M0 is positioned in the zero-order bit of the variable r2.

At this stage, the zero-order bit of the variable r1 expresses the AND result of the IL row number (2) and the OR result of the IL row number (4). Therefore, in the C row number "012:", an OR operation of the variable r1 and the variable r2 is carried out in bit units to realize the OR operation of the IL row number (6). The result of the OR operation is substituted into the variable r1. Therefore, the zero-order bit of the variable r1 expresses the result of the OR operation of the variable r1 and the zero-order bit of the variable r2. In other words, the zero-order bit of the variable r1 expresses the result of the OR operation of the operation result of the IL row number (5) and the bit data M0.

Next, in the C row number "013:", an AND operation of the variable r1 and a hexadecimal value "0001" is carried out in bit units to maintain the state of only the zero-order bit of the variable r1 and to clear the bit data of the first to seventh bits of the variable r1. A result of the AND operation is substituted into the variable r1.

Further, in the C row number "014:", the value of the variable r1 is substituted into the variable r2. In the C row number "015:", the value of the variable r1 is substituted into the variable r3. Further, in the C row number "016:", the value of the variable r2 is shifted to the left by one bit, and the shifted result is substituted into the variable r2 again. In other words, at this stage, the bit data of the operation result of the IL row number (6) is positioned in the first bit of the variable r2.

Next, in the C row number "017:", the value of the variable r3 is shifted to the left by two bits, and the shifted result is substituted into the variable r3 again. In other words, at this stage, the bit data of the operation result of the IL row number (6) is positioned in the second bit of the variable r3.

In the C row number "018:", an OR operation of the variable r1 and the variable r2 is carried out in bit units. The result of the OR operation is substituted into the variable r1. As a result, the zero-order bit and the first bit of the variable r1 respectively show the bit data that is the operation result of the IL row number (6).

In the C row number "019:", an OR operation of the variable r1 and the variable r3 is carried out in bit units. A result of the OR operation is substituted into the variable r1. As a result, all of the bits from the zero-order bit to the second bit of the variable r1 show the bit data that is the operation result of the IL row number (6).

At this stage, the data of the bit device Y0, Y8 and M10 have been allocated in this order to the zero-order bit to the second bit of the address "c001". Therefore, in the C row number "020:", the value of the variable r1 is written into the address "c001", in order to realize the processing of the IL row numbers (7) to (9).

As explained above, in the source list expressed in the C language shown in FIG. 4, the data reading operation occurs only once in the C row number "002:", and the data writing operation occurs only once in the C row number "020:". In other words, when n clock cycles larger than 1 are required for making access to each device, the necessary number of clock cycles is 2×n clock cycles. Thus, the execution time becomes shorter than 8×n (=10×n−2×n) that is required in the program shown in FIG. 15.

Further, the logic processing is also simplified at many places. Therefore, while twenty-four steps are required, including the declaration of variables in the program shown in FIG. 15, the required number of steps is reduced to twenty steps in the program shown in FIG. 4. As a result, the execution time can be reduced substantially, including the difference in the number of clock cycles required for data input/output.

Thus, in the control program development supporting apparatus 20, the general-purpose language compiler 102 compiles the source list expressed in the C language that has been generated in this way, and finally outputs the execution code 9.

In the meantime, in the programmable controller 90, the general-purpose processor 11 downloads the execution code 9, and reads the configuration data 8 into the variable address conversion section 84.

When the restructure instruction described in the configuration data 8 is for an address positioned in the physical address space 40, the variable address conversion section 84 extracts the bit data assigned in the configuration data 8 from the bit data positioned in the physical address space 40. Then, the variable address conversion section 84 allocates the extracted bit data to a specific address in the physical address space 40.

FIG. 5 is a diagram showing an example of an allocation of the bit data restructured by the variable address conversion section 84 in the physical address space 40. In FIG. 5, addresses "0100h" and "0101h" are the addresses that have been newly allocated by restructuring. For example, "M14" of the first bit in the address "0100h" is bit data that has been positioned at the fourth bit of an address "0002h" shown in FIG. 11. Similarly, "M7" of the seventh bit in the address "1000h" is bit data that has been positioned at the seventh bit of the address "0000h".

When the restructure instruction described in the configuration data 8 is for an address positioned in the I/O address space 50, the variable address conversion section 84 extracts the bit data assigned in the configuration data 8 from the bit data positioned in the I/O address space 50. Then, the variable address conversion section 84 allocates the extracted bit data to a specific address in the I/O address space 50.

Figure 6:
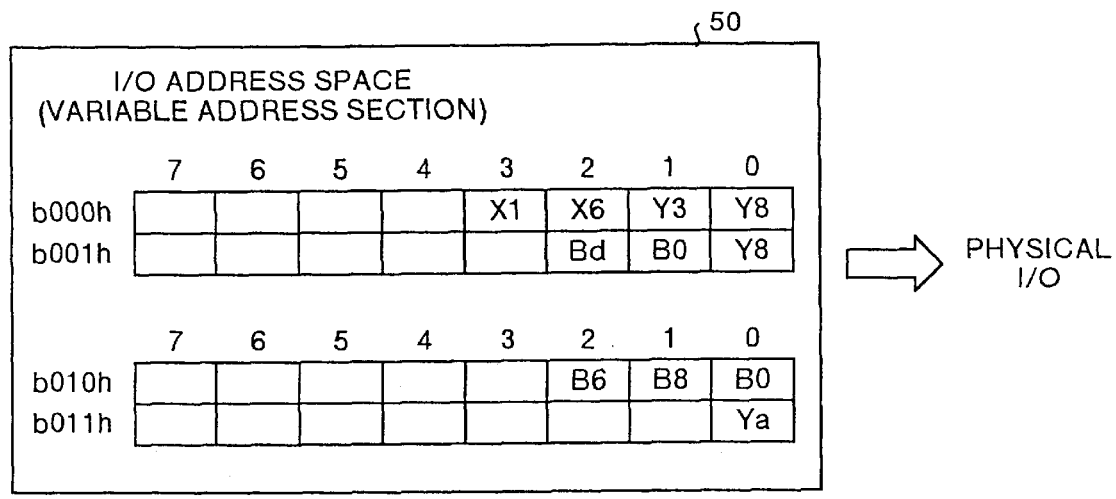
FIG. 6 is a diagram showing an example of an allocation of an I/O address space restructured by a variable address conversion section in the program executing apparatus relating to the embodiment of the invention.

FIG. 6 is a diagram showing an example of an allocation of the bit data restructured by the variable address conversion section 84 in the I/O address space 50. In FIG. 6, addresses "b001h" and "b001h", "b101h" and "b011h" are the addresses that have been newly allocated by restructuring.

When the restructure instruction described in the configuration data 8 is for an address positioned in the physical I/O address mixed space 60, the variable address conversion section 84 extracts the bit data assigned in the configuration data 8 from the bit data positioned in the physical I/O address mixed space 60. Then, the variable address conversion section 84 allocates the extracted bit data to a specific address in the physical I/O address mixed space 60.

Figure 7:
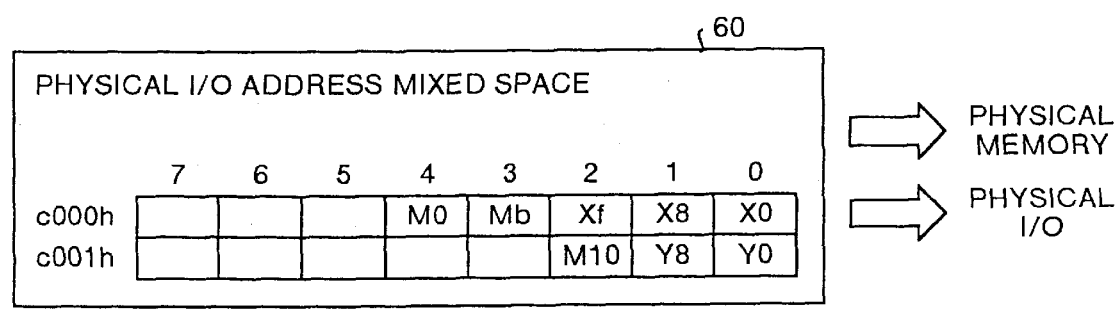
FIG. 7 is a diagram showing an example of an allocation of a physical address space and an I/O address space in a mixed structure by the variable address conversion section in the program executing apparatus relating to the embodiment of the invention.

FIG. 7 is a diagram showing an example of an allocation of the bit data restructured by the variable address conversion section 84 in the physical I/O address mixed space 60. In FIG. 7, addresses "c000h" and "c001h" are the addresses that have been newly allocated by restructuring. Particularly, in the physical I/O address mixed space 60, bit data that is allocated to one address includes the bit data for making access to the physical memory and the physical I/O.

As explained above, the bit data corresponding to all or a part of the bit device to be controlled in the control program 1 is concentrated in one or a few addresses. Based on this arrangement, when only the byte data of this address is read, it is not necessary to read byte data of a different address for each bit data. Thus, it becomes possible to substantially decrease the number of access made to the external data.

As a method of setting the configuration data 8 to the variable address conversion section 84, when the variable address conversion section 84 is the CPLD or the FPGA, JTAG configuration means is employed, for example. When the variable address conversion section 84 includes a microcontroller, an exclusive program is used or exclusive data is downloaded.

When the variable address section has been generated, and an input/output request from the general-purpose processor 11 is for a restructured address as shown in FIG. 5, for example, the companion chip 70 makes access to the address by the variable address conversion section 84.

Figure 8:
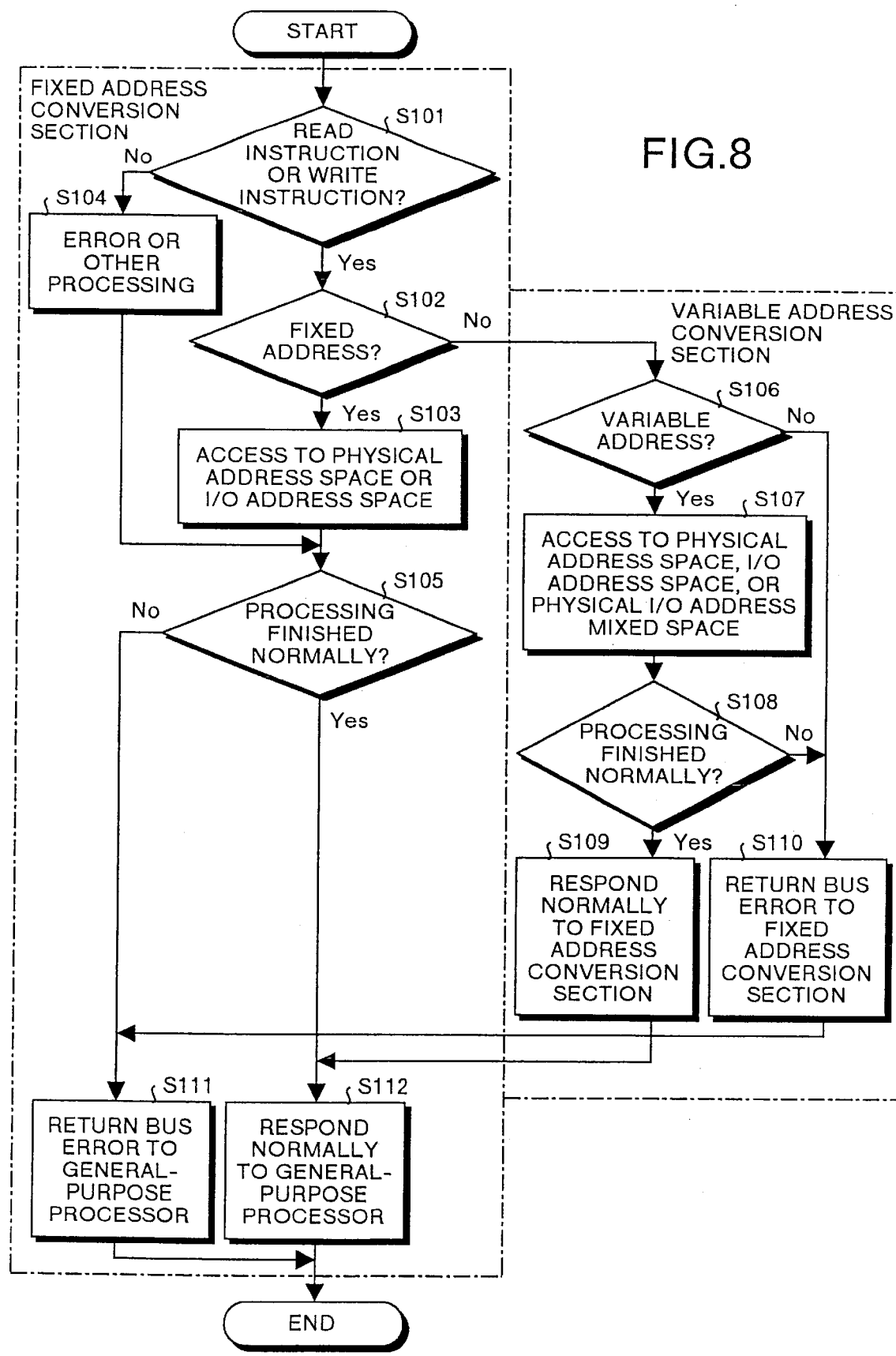
FIG. 8 is a flowchart showing an address access operation in the program executing apparatus relating to the embodiment of the invention.

The address access operation carried out through the companion chip 70 will be explained next. FIG. 8 is a flowchart showing the address access operation. Referring to FIG. 8, first, when an input/output request from the general-purpose processor 11 is a read instruction or a write instruction (Yes at step S101), the companion chip 70 makes a decision as to whether the input/output request is for a fixed address or not (step S102). The fixed address means an address that belongs to a fixed address section of the physical address space 40 or the I/O address space 50, and this is an address arrayed in a manner similar to that of the conventional practice as shown in FIG. 11 and FIG. 12.

When the input/output request from the general-purpose processor 11 is not a read instruction or a write instruction at step S101, the companion chip transmits an error signal to the general-purpose processor 11 or executes other interruption processing (step S104). When the input/output request is for a fixed address at step S102, the fixed address conversion section 82 makes access to the fixed address section of the physical address space 40 or the I/O address space 50 (step S103).

When access to the fixed address section has been carried out normally (Yes at step S105), the fixed address conversion section 82 provides a normal response to the general-purpose processor 11 (step S112). The normal response in this case refers to processing of returning reading data to a read instruction, and returning a signal of a completion of writing to a write instruction.

On the other hand, when access to the fixed address section has not been carried out normally (No at step S105) the fixed address conversion section 82 posts a bus error to the general-purpose processor 11 (step S111). The fixed address conversion section 82 carries out each process in the steps S101 to S105, S111, and S112.

When the input/output request is not for the fixed address at step S102, a decision is made as to whether the input/output request is for a variable address (step S106). The variable address means an address that belongs to a variable address section of the physical address space 40 or the I/O address space 50, or an address that belongs to a physical I/O address mixed space 60. This is a restructured address as shown in FIGS. 4 to 6.

When the input/output request is for the variable address at step S106, the variable address conversion section 84 makes access to the variable address section of the physical address space 40 or the I/O address space 50, or the physical I/O address mixed space 60 (step S107).

When the access to the variable address section or the physical I/O address mixed space has been carried out normally (Yes step S108), the variable address conversion section 84 provides a normal response to the fixed address conversion section 82 (step S109). The normal processing is as explained above.

When the input/output request is not for the variable address at step S106, or when the access to the variable address has not been carried out normally (Yes at step S105), the variable address conversion section 84 posts a bus error to the fixed address conversion section 82 (step S110). The variable address conversion section 84 carries out each of the steps S106 to S110.

After the processing at step S109, the fixed address conversion section 82 executes the processing at step S112. After the processing at step S110, the fixed address conversion section 82 executes the processing at step S111.

As explained above, the program development supporting apparatus relating to the present embodiment allocates the bit data corresponding to all or a part of the bit device to be controlled in the control program 1, in concentration to one or a few specific addresses. The program executing apparatus then converts the control program 1 into the general-purpose language program 5 for making access to a specific address, and outputs the execution code 9 of the general-purpose language program 5. Further, the program development supporting apparatus relating to the present embodiment outputs the configuration data 8 that describes the information on the specific address.

In the meantime, according to the program executing apparatus relating to the present embodiment, the companion chip 70 includes the re-structure-able address conversion section 80. The re-structure-able address conversion section 80 sets the specific address to the variable address section based on the configuration data 8, and makes access to the variable address section according to the input/output request from the general-purpose processor 11 generated according to the execution code 9.

Therefore, according to a system constructed of the program executing apparatus and the program development-supporting apparatus relating to the present embodiment, the system reads only the byte data at a specific address positioned in the variable address section. Thus, the system does not need to read the byte data at a different address for each bit of data like the conventional system. As a result, it becomes possible to substantially decrease the number of access is to be made to the external data. This enables the system to execute the program at a higher speed.

The re-structure-able address conversion section 80 may carry out the conversion processing for all the addresses that are included in the input/output request from the general-purpose processor 11. Alternatively, the re-structureable address conversion section 80 may be installed in the general address conversion section as an additional section. In that case, the general address conversion section carries out the conversion for a general address access, and the re-structureable address conversion section 80 carries out the conversion only for input/output to a specific address.

Further, the program executing apparatus may read the configuration data 8 together with the downloading of the execution code 9 as described above. Alternatively, when an access to a restructured address has occurred, or when a request for making access to an address not recognized by the companion chip 70 has occurred during the execution of the execution code 9, the program executing apparatus saves the execution state, dynamically searches the configuration data 8 and reads this configuration data 8. In this case, after reading the configuration data 8, the program executing apparatus returns the saved execution state, and continues the execution of the program based on the execution code 9.

In the above-described embodiment, the program executing apparatus is used as for executing the program, and the program development supporting apparatus is used as the environment for developing the program. Thus, only two apparatus are distinguished. Alternatively, in a system having both of the above environments, that is, in a general-purpose computer system, it is possible to carry out all of the development of the control program 1, generation of the general-purpose program 5 and the execution code 9, generation of the configuration data 8, restructuring of the address based on the configuration data 8, and execution of the execution code 9.

As explained above, according to the present invention, a re-structureable address conversion section is provided. Therefore, when it is necessary to access bit data distributed to a plurality of different addresses in the contents of a program to be executed by a processor, it is possible to generate one or a few addresses to which these bit data are corresponded in concentration. As a result, it is possible to execute the program at a faster speed.

Further, it is possible to allocate a bit position as an optional bit unit to a specific address. Therefore, it is possible to array an optimum address for an external access in an optional bit unit on the program to be executed by the processor. As a result, there is an effect that it is possible to execute the program at a faster speed.

Further, an optional bit position is allocated to optional positions in a plurality of specific addresses. Therefore, for inputting/outputting the same bit data, it becomes possible to make an optimum external access together with processing before or after the processing of the program using this bit data. As a result, it is possible to execute the program at a faster speed.

Further, bit position in the physical memory and bit position in the physical I/O are allocated to a specific address in a mixed state. Therefore, it is possible to decrease the number of addresses to be accessed for a processing that requires accessing both the physical address space and the I/O address space. As a result, there is an effect that it is possible to execute the program at a faster speed.

Further, it becomes possible to realize processing by a general program development execution method when there is no data to be restructured by the re-structureable address conversion section. Further, when there has been an access to a data array based on an operation result in the processing program, it is easily possible to process this array using a general-purpose address conversion. As a result, it is possible to execute the program at a faster speed.

Further, in order to make the program executing apparatus execute optimally a program developed by the program development supporting apparatus, it is possible to instruct the program executing apparatus to restructure an address using configuration data.

Further, it is possible to generate a new optimum program that the program executing apparatus can execute at a high speed according to the contents of the configuration data.

Further, it is possible to obtain a new program as a general-purpose language program. Therefore, a user can utilize a development tool for a processor available in the market, without a need for preparing a special development environment. As a result, it is possible to restrict unnecessary expenses at the user side.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A program executing apparatus comprising:
   a memory including a physical memory and an I/O memory; and
   an address conversion unit which mediates input of data to and output of data from the memory by extracting bit data from a bit position at an address in one of the physical memory and the I/O memory based on configuration data that describes correspondence between each bit at a specific address and bit data at an address in the memory and allocating that bit data to a bit position at the specific address in the one of the physical memory and the I/O memory according to the configuration data,
   wherein said address conversion unit extracts bit data stored at a plurality of different addresses within a physical address space and an I/O address space, and allocates that bit data to bit positions stored at the specific address, and mediates input and output of data according to a request from the processor to access the specific address, and
   wherein the bit data stored at the specific address is extracted from both the physical memory and the I/O memory.

2. A program executing apparatus comprising:
   a memory including a physical memory and an I/O memory; and
   an address conversion unit which mediates input of data to and output of data from the memory by extracting bit data from a bit position at an address in one of the physical memory and the I/O memory based on configuration data that describes correspondence between each bit at a specific address and bit data at an address in the memory and allocating that bit data to a bit position at the specific address in the one of the physical memory and the I/O memory according to the configuration data, wherein said address conversion unit extracts bit data stored at a plurality of different addresses within a physical address space and an I/O address space, and allocates that bit data to bit positions stored at a plurality of specific addresses, and mediates input and output of data according to a request from the processor to access the specific addresses, and wherein the bit data stored at the specific addresses is extracted from both the physical memory and the I/O memory.

* * * * *